(12) United States Patent
Ito et al.

(10) Patent No.: US 12,283,904 B2
(45) Date of Patent: Apr. 22, 2025

(54) MOTOR CONTROL DEVICE AND COMPUTER PROGRAM

(71) Applicant: KYB Corporation, Tokyo (JP)

(72) Inventors: Kensuke Ito, Kanagawa (JP); Tomoyuki Kawano, Kanagawa (JP)

(73) Assignee: KYB CORPORATION, Tokyo (JP)

( * ) Notice: Subject to any disclaimer, the term of this patent is extended or adjusted under 35 U.S.C. 154(b) by 120 days.

(21) Appl. No.: 18/165,824

(22) Filed: Feb. 7, 2023

(65) Prior Publication Data
US 2023/0268863 A1 Aug. 24, 2023

(30) Foreign Application Priority Data

Feb. 22, 2022 (JP) .................................. 2022-025645
Nov. 21, 2022 (JP) .................................. 2022-185890

(51) Int. Cl.
*H02P 27/08* (2006.01)
(52) U.S. Cl.
CPC .................................. *H02P 27/08* (2013.01)
(58) Field of Classification Search
CPC ................................ H02P 6/085; H02P 27/08
USPC ........................................................ 318/599
See application file for complete search history.

(56) References Cited

U.S. PATENT DOCUMENTS

| | | | | |
|---|---|---|---|---|
| 2008/0200788 A1* | 8/2008 | Brister | ................... | C12Q 1/006 600/345 |
| 2009/0131776 A1* | 5/2009 | Simpson | ................ | C12Q 1/006 600/365 |
| 2011/0187308 A1* | 8/2011 | Suhama | ................... | H02P 21/00 318/798 |
| 2014/0176027 A1* | 6/2014 | Osaki | ....................... | H02P 6/28 318/400.2 |
| 2014/0297131 A1* | 10/2014 | Kashima | ................ | B62D 5/046 701/42 |

FOREIGN PATENT DOCUMENTS

JP 2019-149900 A 9/2019

\* cited by examiner

*Primary Examiner* — Gabriel Agared
(74) *Attorney, Agent, or Firm* — Rabin & Berdo, P.C.

(57) ABSTRACT

A motor control device according to the present disclosure is a motor control device configured to control voltage signals of a plurality of phases, the voltage signals being applied to an alternating-current motor, the motor control device including: a differential-value calculation unit configured to calculate the time differential value of a virtual line connecting peak values of each of phase voltage signals that are the voltage signals of the respective phases, the voltage signals being input to the alternating-current motor; a wavelength calculation unit configured to calculate the wavelength of each phase voltage signal input to the alternating-current motor from the time differential value; and a switching-signal generation unit configured to generate, based on the calculated wavelength, a signal that switches the phase of the alternating-current motor to which alternating-current voltage is applied.

7 Claims, 15 Drawing Sheets

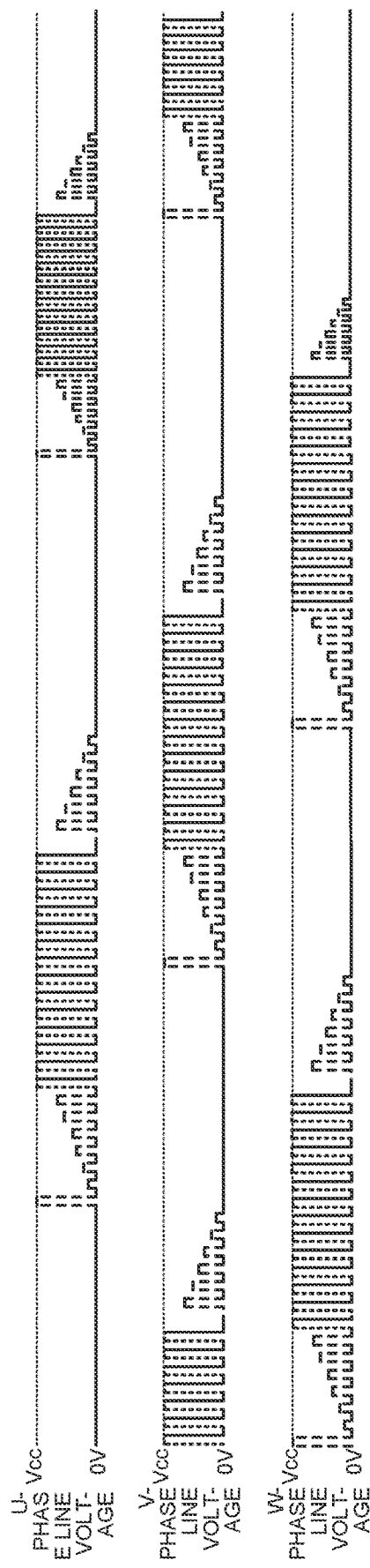

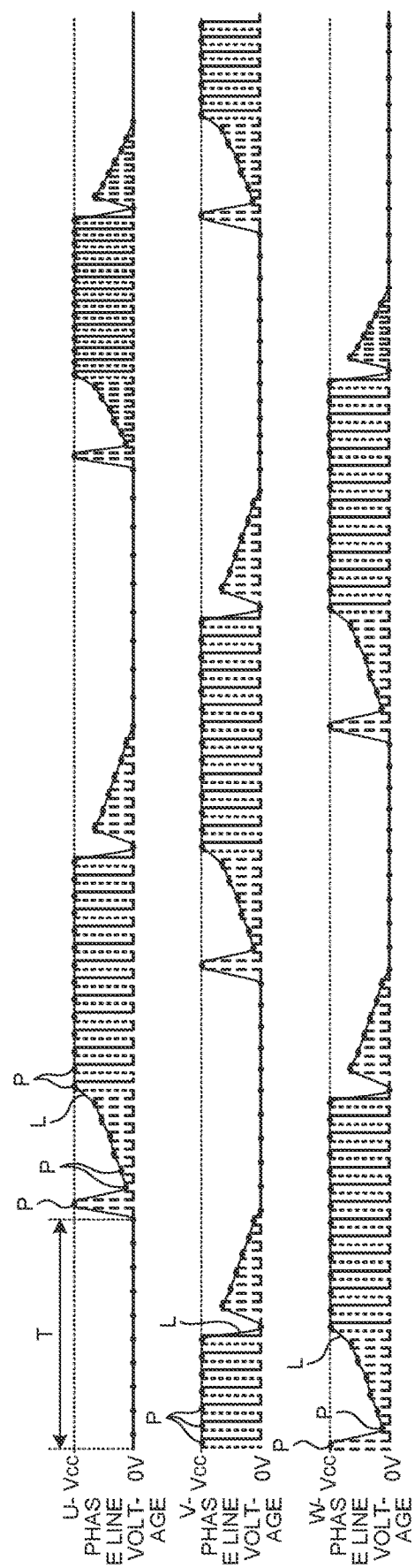

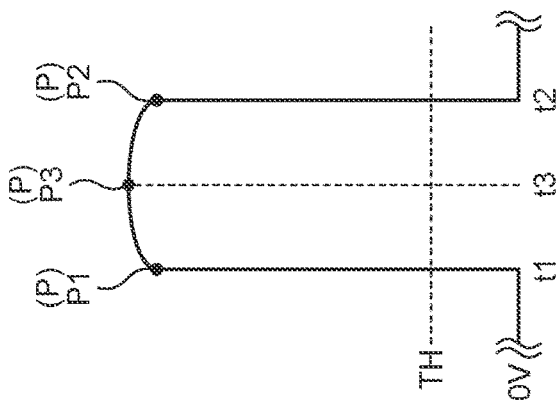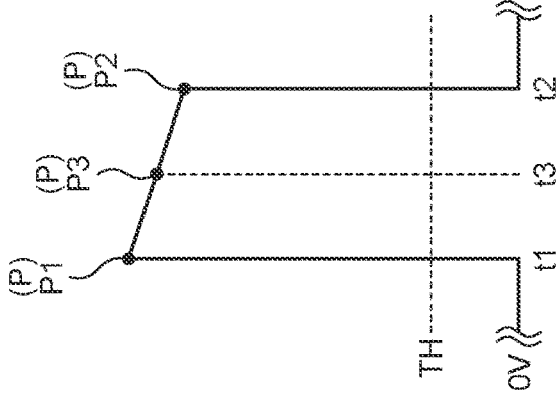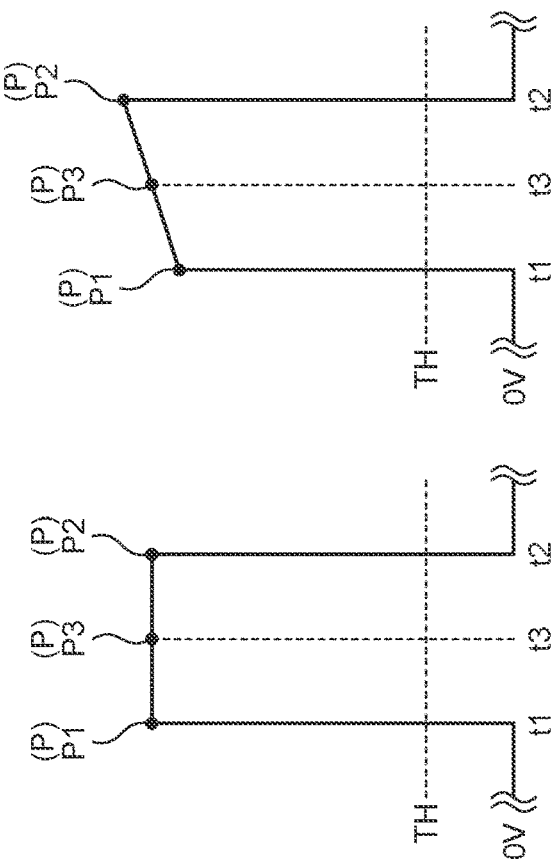

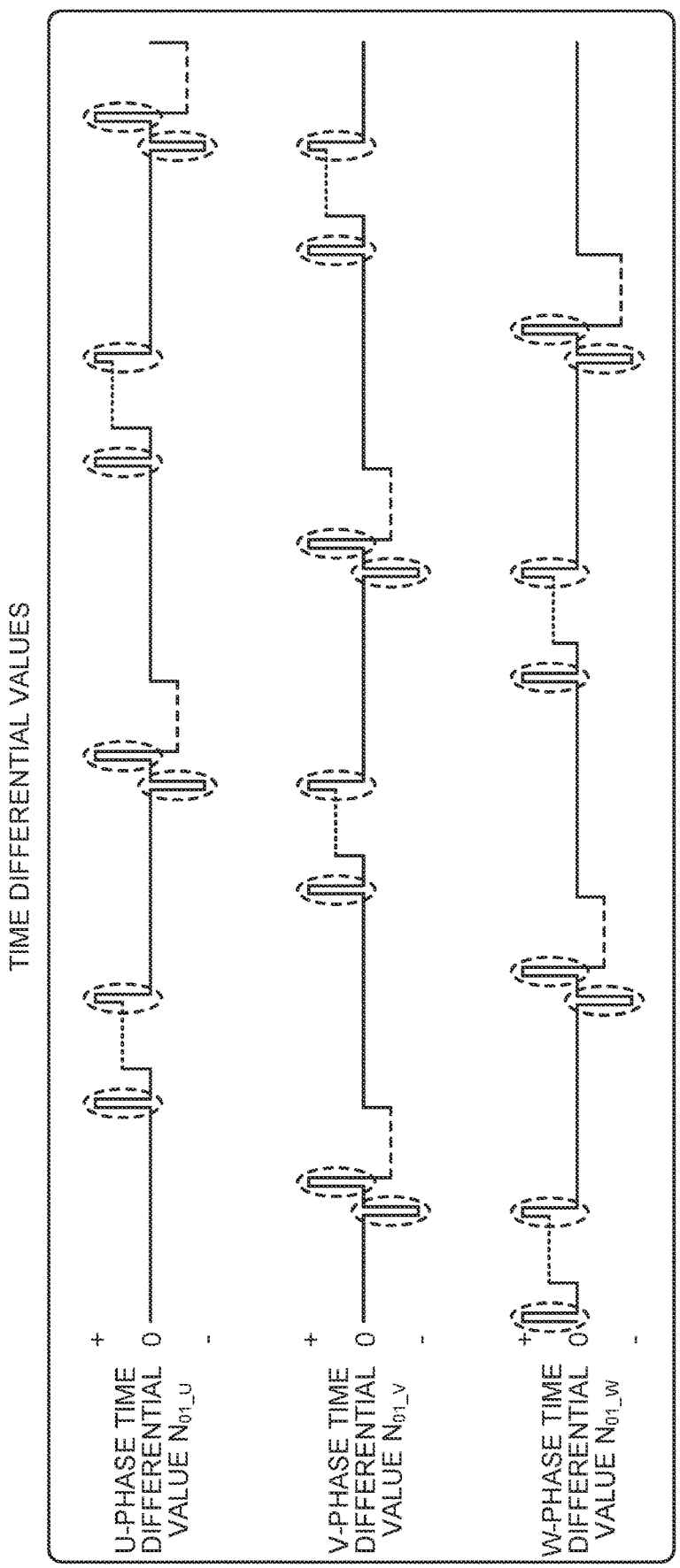

MOTOR CONTROL DEVICE AND COMPUTER PROGRAM

CROSS-REFERENCE TO RELATED APPLICATIONS

This application is based upon and claims the benefit of priority from Japanese Patent Application No. 2022-025645, filed on Feb. 22, 2022; and Japanese Patent Application No. 2022-185890, filed on Nov. 21, 2022, the entire contents of all of which are incorporated herein by reference.

BACKGROUND OF THE INVENTION

1. Field of the Invention

The present disclosure relates to a motor control device and a computer program.

2. Description of the Related Art

When a load on a motor abruptly changes while the motor is driven at a constant rotation speed with sensor-less energization, a difference occurs between a predicted rotation period of the motor in a control system and the actual rotation period of the motor in some cases. When the difference between the predicted rotation period of the motor in the control system and the actual rotation period of the motor increases, torque may no longer be obtained and step-out occurs in some cases. The related technologies are described, for example, in Japanese Patent Application Laid-open No. 2019-149900.

The present disclosure is made in view of the above-described problem and intended to provide a motor control device and a computer program that are capable of providing desired torque for a load on a motor.

SUMMARY OF THE INVENTION

It is an object of the present invention to at least partially solve the problems in the conventional technology.

The motor control device of the present disclosure is configured to control voltage signals of a plurality of phases, the voltage signals being applied to an alternating-current motor, the motor control device comprises: a differential-value calculation unit configured to calculate the time differential value of a virtual line connecting peak values of each of phase voltage signals that are voltage signals of the respective phases, the voltage signals being input to the alternating-current motor; a wavelength calculation unit configured to calculate the wavelength of each phase voltage signal input to the alternating-current motor from the time differential value; and a switching-signal generation unit configured to generate, based on the calculated wavelength, a signal that switches the phase of the alternating-current motor.

The computer program of the present disclosure controls voltage signals of a plurality of phases, the voltage signals being applied to an alternating-current motor, the computer program is configured to cause a computer to execute: calculating the time differential value of a virtual line connecting peak values of each of phase voltage signals that are voltage signals of the respective phases, the voltage signals being input to the alternating-current motor; calculating the wavelength of each phase voltage signal input to the alternating-current motor from the time differential value; and generating, based on the calculated wavelength, a signal that switches the phase of the alternating-current motor.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating temporal change of phase voltage signals;

FIG. 4 is a diagram illustrating exemplary virtual lines each connecting peak values of the corresponding phase voltage signal;

FIGS. 5A to 5D are diagrams illustrating exemplary peak values of each phase voltage signal;

FIG. 6 is a diagram illustrating temporal change of the time differential values of phase voltage signals;

DETAILED DESCRIPTION OF THE PREFERRED EMBODIMENTS

The following describes embodiments of the present disclosure in detail with reference to the accompanying drawings. The present disclosure is not limited by the embodiments described below.

First Embodiment

Configuration of Motor System

Figure 1:
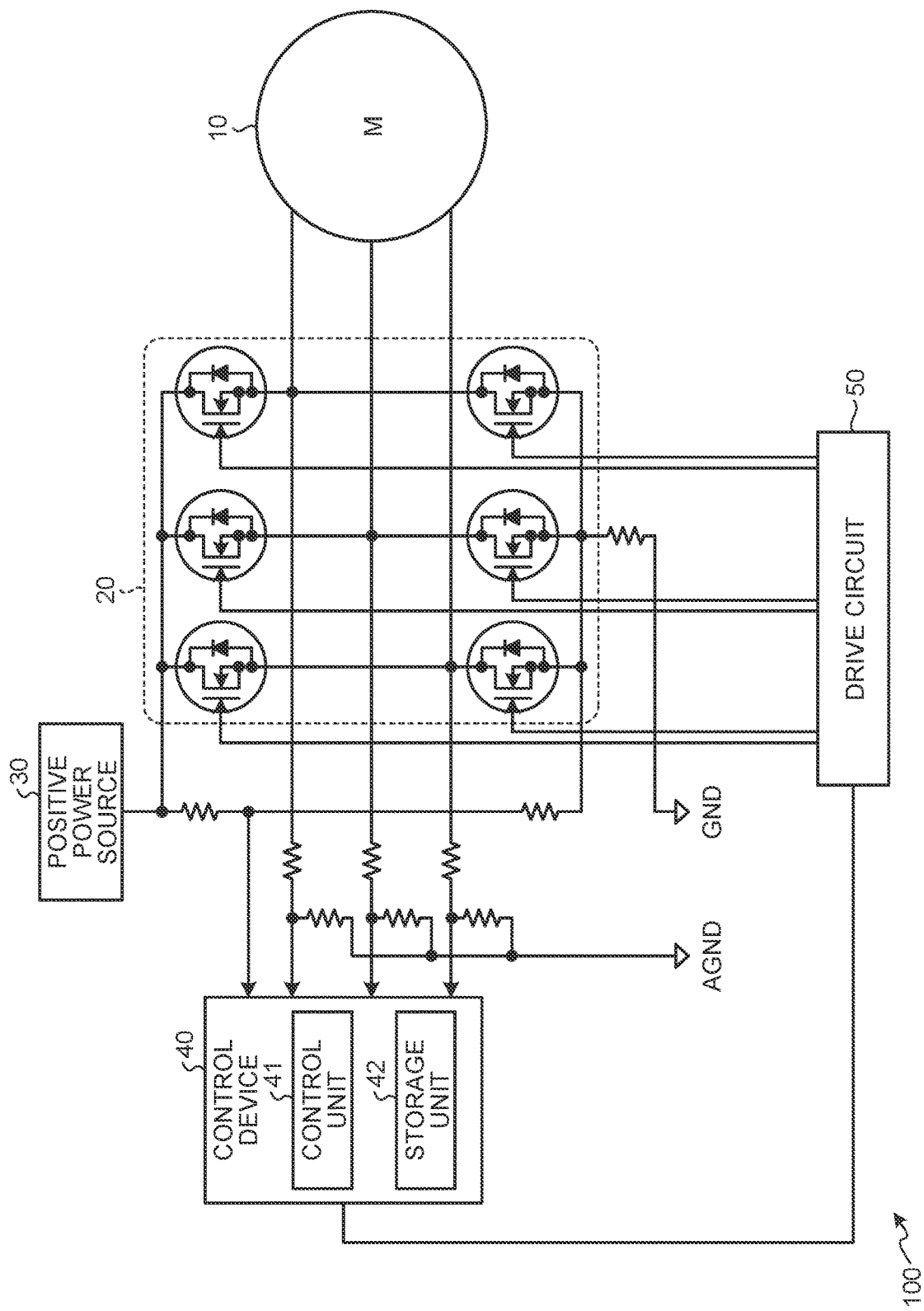
FIG. 1 is a diagram schematically illustrating an exemplary configuration of a motor system according to the present disclosure.

FIG. 1 is a diagram schematically illustrating an exemplary configuration of a motor system according to the present disclosure. As illustrated in FIG. 1, this motor system 100 according to the present disclosure includes an alternating-current motor 10, an inverter 20, a positive power source 30, a control device 40, and a drive circuit 50.

The alternating-current motor 10 converts electric energy into mechanical work. The alternating-current motor 10 includes, for example, a stator and a rotor. The stator is a fixed part of the motor. The stator includes three coils disposed for respective phases of 120°. The three coils are respectively referred to as a U-phase coil, a V-phase coil, and a W-phase coil. The method of connecting the coils may be d-connection or Y-connection. The rotor is a rotational part of the motor. The alternating-current motor 10 generates a magnetic field by applying alternating-current voltage to the coils included in the stator and rotates the rotor by mutual interaction with magnetic force of a permanent magnet included in the rotor. A rotating magnetic field can be easily obtained by using three-phase alternating current. A certain load is connected to an output shaft of the rotor of the alternating-current motor 10, and mechanical work is performed on the load when the rotor of the alternating-current motor 10 rotates. In this manner, the alternating-current motor 10 converts electric energy into mechanical work.

The inverter 20 converts direct-current voltage supplied from the positive power source 30 into alternating-current voltage and supplies the alternating-current voltage to the alternating-current motor 10. The inverter 20 includes an inverter circuit configured to apply the alternating-current voltage to the coil of each phase of the alternating-current motor 10. The inverter circuit includes a semiconductor switching element connected to the coil of the phase of the alternating-current motor 10. Specifically, in the inverter circuit of the inverter 20, a wire connecting the positive power source 30 and the U-phase coil of the alternating-current motor 10 and provided with a semiconductor switching element, a wire connecting the positive power source 30 and the V-phase coil of the alternating-current motor 10 and provided with a semiconductor switching element, and a wire connecting the positive power source 30 and the W-phase coil of the alternating-current motor 10 and provided with a semiconductor switching element are connected in parallel to the positive power source 30.

Each semiconductor switching element may be, for example, a bipolar transistor. Alternatively, each semiconductor switching element may be a gate turn-off thyristor (GTO), an insulated gate bipolar transistor (IGBT), a metal-oxide-semiconductor field-effect transistor (MOSFET), a silicon carbide metal-oxide field-effect transistor (SiC-MOSFET), a gallium nitride field-effect transistor (GaN-FET), or a power semiconductor using gallium oxide ($Ga_2O_3$).

The inverter 20 supplies alternating-current voltage to each phase coil of the alternating-current motor 10 by periodically performing ON/OFF operation, in other words, switching of the corresponding semiconductor switching element as the gate of the semiconductor switching element is provided with a drive signal from the drive circuit 50 to be described later.

The positive power source 30 is a power source that supplies direct-current voltage to the inverter 20. The positive power source 30 may be a battery or a direct-current power source. When direct-current voltage is generated from an alternating-current power source, the positive power source 30 may include a rectification circuit, a transformer, a smoothing capacitor, or the like.

Configuration of Control Device (Motor Control Device)

The control device (motor control device) 40 generates a control signal that controls the alternating-current motor 10. As illustrated in FIG. 1, the control device 40 includes a control unit 41 and a storage unit 42.

The control unit 41 is implemented when various computer programs stored in the storage unit 42 are executed by a central processing unit (CPU), a micro processing unit (MPU), or the like by using a random access memory (RAM) as a work area. Alternatively, the control unit 41 may be implemented by, for example, an integrated circuit such as an application specific integrated circuit (ASIC) or a field programmable gate array (FPGA), or an analog circuit using an operational amplifier.

Figure 2:
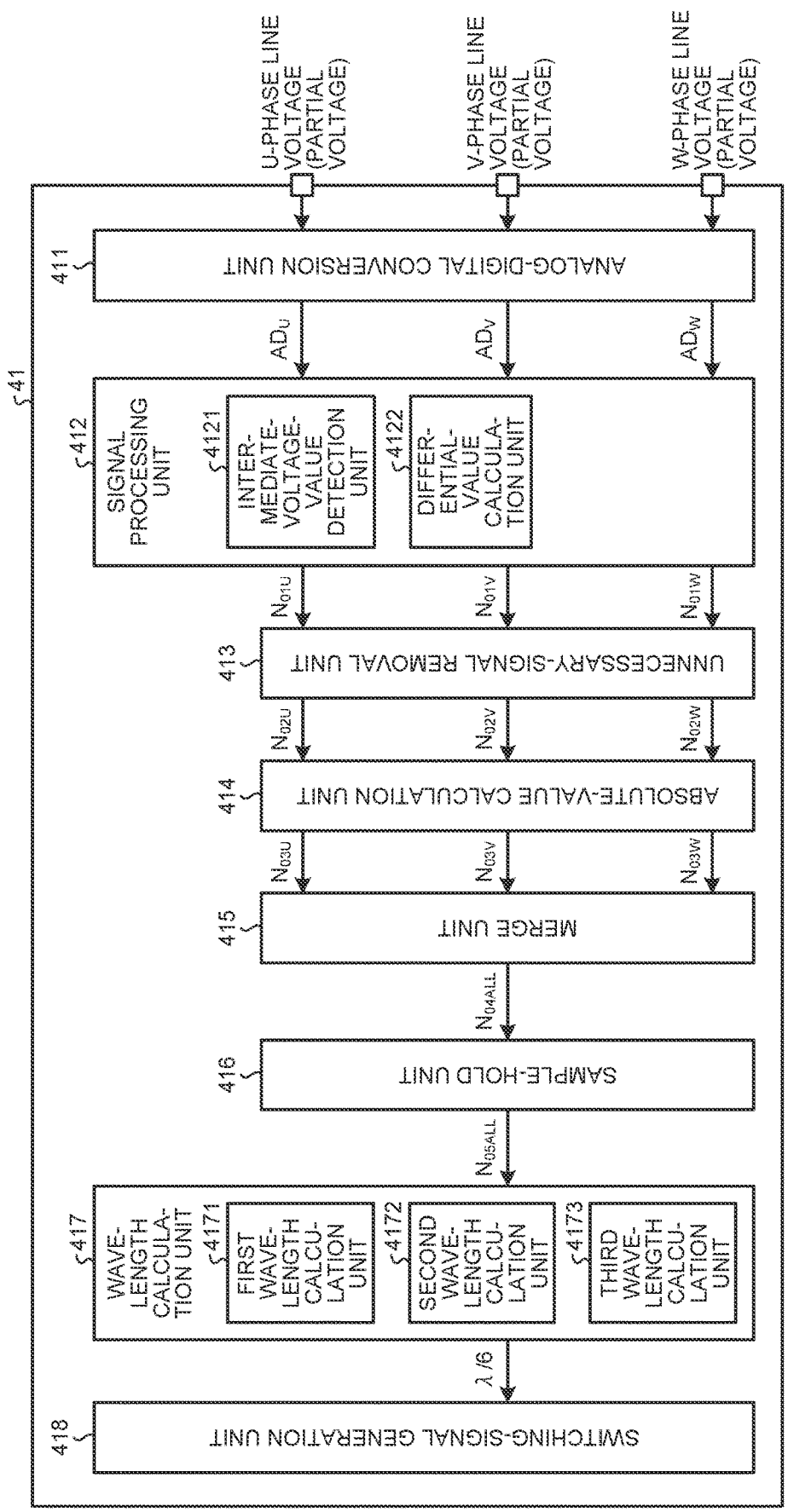
FIG. 2 is a diagram schematically illustrating an exemplary configuration of a control device according to a first embodiment.

The following describes the configuration of the control unit 41 with reference to FIG. 2. FIG. 2 is a diagram schematically illustrating an exemplary configuration of the control unit according to the present disclosure. As illustrated in FIG. 2, the control unit 41 includes an analog-digital conversion unit 411, a signal processing unit 412, an unnecessary-signal removal unit 413, an absolute-value calculation unit 414, a merge unit 415, a sample-hold unit 416, a wavelength calculation unit 417, and a switching-signal generation unit 418.

The analog-digital conversion unit 411 acquires phase voltage signals (U-phase line voltage, V-phase line voltage, and W-phase line voltage) of the alternating-current motor 10 and performs analog-digital conversion of the acquired phase voltage signals. The phase voltage signals are voltage signals of respective phases (in the present example, the U phase, the V phase, and the W phase) input to the alternating-current motor 10. In the present embodiment, each phase voltage signal is a pulse width modulation (PWM) signal, in other words, a signal having a waveform in which a voltage value repeatedly rises and falls with respect to a predetermined voltage value. In other words, the analog-digital conversion unit 411 outputs the phase voltage signals ($AD_U$, $AD_V$, and $AD_W$) subjected to the analog-digital conversion. The analog-digital conversion unit 411 may acquire each phase voltage signal of the alternating-current motor 10 with reference to the ground.

FIG. 3 is a diagram illustrating temporal change of the phase voltage signals. As illustrated in FIG. 3, a peak value of each phase voltage signal gradually increases at a certain gradient for a certain time since a moment at which alternating-current voltage is applied to the corresponding phase coil of the alternating-current motor 10. Thereafter, each phase value signal having a peak voltage at a voltage value applied by the positive power source 30 is repeated for a certain time. When logic output is turned off, the peak value of each phase voltage signal gradually decreases at a certain gradient. The analog-digital conversion unit 411 acquires such analog phase voltage signals and converts the analog phase voltage signals into digital phase voltage signals. When a voltage signal in the duration from the rise to fall of the voltage signal value is defined as one cycle of the voltage signal, a peak value of the voltage signal is the maximum voltage value in one cycle of the voltage signal.

The analog-digital conversion unit 411 may be, for example, a flash type or successive-approximation type configured to convert an analog signal into a digital signal by using a circuit configured to compare input voltage with reference voltage and output whether the input voltage is higher or lower than the reference voltage.

The signal processing unit 412 processes each phase voltage signal of the alternating-current motor 10 subjected to analog-digital conversion. The signal processing unit 412 includes an intermediate-voltage-value detection unit 4121 and a differential-value calculation unit 4122.

The intermediate-voltage-value detection unit 4121 detects an intermediate voltage value of each phase voltage signal of the alternating-current motor 10 from the phase voltage signal. More specifically, the intermediate-voltage-value detection unit 4121 detects, from each phase voltage signal, a timing at which the signal value of the phase voltage signal becomes equal to the intermediate voltage value. The intermediate voltage value is a voltage value between the lower and upper limit values that the voltage value of each phase voltage signal can take. The intermediate voltage value may be any value between the lower and upper limit values that the voltage value can take, but is preferably the median of the lower and upper limit values. Specifically, for example, when the lower limit value is 0 V and the upper limit value is 12 V, the intermediate voltage value is preferably 6 V, which is the starting point for wavelength utilization. For example, the starting point may be a point exceeding 6 V, and the switching timing may be at a point reached by advancing 30° in electrical angle. The angle is not limited to 30° but may be changed as appropriate in accordance with the rotation speed of the alternating-current motor 10.

The differential-value calculation unit 4122 calculates the time differential value of a virtual line L connecting peak values P of each phase voltage signal of the alternating-current motor 10 to be described later. In other words, the differential-value calculation unit 4122 outputs the time differential value ($N_{O1U}$, $N_{O1W}$, or $N_{O1V}$) of the virtual line L connecting peak values P of each phase voltage signal of the alternating-current motor 10. As illustrated in FIG. 3, the peak value of each phase voltage signal of the alternating-current motor 10 increases at a certain gradient for a certain time since a moment at which logic output is turned on, and the peak value decreases at a certain gradient for a certain time since a moment at which logic output is turned off.

FIG. 4 is a diagram illustrating exemplary virtual lines each connecting peak values of the corresponding phase voltage signal. The differential-value calculation unit 4122 detects, from each phase voltage signal of the alternating-current motor 10, a peak value P of the phase voltage signal of the alternating-current motor 10 at each time. Then, the differential-value calculation unit 4122 calculates, based on the peak value P of each phase voltage signal at each time, the time differential value of the virtual line L connecting the peak values P at the respective times. Specifically, for example, the differential-value calculation unit 4122 detects, from the U-phase voltage signal, a peak value P of the U-phase voltage signal at each time and calculates, based on the peak value P of the U-phase voltage signal at each time, the time differential value of the virtual line L connecting the peak values P of the U-phase voltage signal by differentiating the virtual line L connecting the peak values P at the respective times with respect to time.

In the present embodiment, a peak value P of a voltage signal is a voltage signal value out of the range of a certain threshold TH to be described later among the voltage signal values at the respective times, in other words, is a voltage signal value out of the range of the threshold TH in each cycle of the voltage signal. In the example of the present embodiment, as illustrated in FIG. 4, the waveform of each phase voltage signal has a repeating cycle in which the voltage signal value is maintained at a reference value (in the present example, 0 V) in the range of the certain threshold TH for a certain duration, changes to a voltage value out of the range of the certain threshold TH (in the present example, a voltage value higher than the certain threshold TH), is maintained out of the range of the certain threshold TH for a certain duration, and thereafter returns to the reference value in the range of the certain threshold TH. In other words, the waveform of each phase voltage signal is a cycle waveform in which a time slot in which the voltage signal value is maintained in the range of the certain threshold TH and a time slot in which the voltage signal value is maintained out of the certain range are alternately repeated. Thus, as illustrated in FIG. 4, a peak value P of a voltage signal is a voltage signal value in a time slot in which the voltage signal value is maintained out of the range of the certain threshold TH. Since time slots in which the voltage signal value is maintained out of the range of the certain threshold TH are repeated with interposed therebetween a time slot in which the voltage signal value is maintained in the range of the certain threshold TH, each virtual line L connecting peak values P is a line connecting voltage values (peak values P) in respective time slots in which the voltage signal value is maintained out of the range of the certain threshold TH as illustrated in FIG. 4. The certain threshold TH may be set as desired. For example, in the present embodiment, the voltage signal value changes between ground and positive power voltage Vcc (in the present example, 0 V to 12 V), and thus the voltage signal value may be determined to be out of the range of the certain threshold TH when the voltage signal value is higher than 0 V.

FIGS. 5A to 5D are diagrams illustrating exemplary peak values of each phase voltage signal. As described above, a peak value P of a voltage signal is a voltage signal value in a time slot in which the voltage signal value is maintained out of the range of the certain threshold TH. As illustrated in FIGS. 5A to 5D, a first timing t1 is defined as a timing at which the voltage signal value changes from the inside of the range of the certain threshold TH to the outside of the range of the certain threshold TH (in the present example, a voltage value higher than the certain threshold TH), and a second timing t2 is defined as a timing at which the voltage signal value returns from the outside of the range of the certain threshold TH to the inside of the range after the first timing t1. The first timing t1 is such a timing that the voltage signal value detected previously is in the certain range and the voltage signal value detected at the first timing t1 is out of the certain range. Similarly, the second timing t2 is such a timing that the voltage signal value detected at the second timing t2 is out of the certain range and the voltage signal value detected next is in the certain range. In the present example, each voltage signal has a PWM waveform with which the voltage value repeatedly rises and falls with respect to 0 V, and thus the first timing t1 is a timing at which the voltage value rises from 0 V, and the second timing t2 is a timing at which the voltage value falls to 0 V. As illustrated in FIGS. 5A to 5D, the voltage signal value is maintained out of the range of the certain threshold TH in the time slot from the first timing t1 to the second timing t2. In this case, the differential-value calculation unit 4122 may regard, as a peak value P in one time slot in which the voltage signal value is maintained out of the range of the certain threshold TH, the voltage signal value at any timing between the first timing t1 and the second timing t2.

The differential-value calculation unit 4122 may acquire a peak value P of each phase voltage signal by any method based on the phase voltage signal. For example, the differential-value calculation unit 4122 may sequentially acquire a voltage signal, determine whether the value of the acquired voltage signal is in the range of the certain threshold TH, and acquire, as a peak value P, the voltage signal value out of the range of the threshold TH. However, the determination of whether the voltage signal value is out of the range of the threshold TH is not essential. For example, the control unit 41 knows the output timing of a PWM signal, and thus the differential-value calculation unit 4122 may acquire a timing at which the voltage signal value has a peak value P, which is recognized based on the output timing of a PWM signal, and acquire the voltage signal value at the timing as a peak value P. The threshold TH can be set as desired when processing of acquiring a peak value P based on the threshold TH is performed, and thus, for example, the threshold TH may be set to be higher than a reference voltage (in the present example, 0 V) with noise taken into account, which can prevent false sensing of a peak value P due to noise.

As described above, the differential-value calculation unit 4122 may regard, as a peak value P, the voltage signal value at any timing between the first timing t1 and the second timing t2. For example, the differential-value calculation unit 4122 may regard a voltage signal value P1 at the first timing t1 as a peak value P, may regard a voltage signal value P2 at the second timing t2 as a peak value P, or may regard a voltage signal value P3 at a middle-point timing t3 as a peak value P. In other words, the differential-value calculation unit 4122 may regard the voltage signal value P1 at the first timing t1, the voltage signal value P2 at the second timing t2, or the voltage signal value P3 at the middle-point timing t3 in one time slot in which the voltage signal value is maintained out of the range of the certain threshold TH, as a peak value P in the time slot. The middle-point timing t3 is a timing at the middle point between the first timing t1 and the second timing t2. In other words, the middle-point timing t3 is a timing between the first timing t1 and the second timing t2 and is a timing across which the time from the first timing t1 to the middle-point timing t3 is equal to the time from the middle-point timing t3 to the second timing t2.

The voltage signal value may have any temporal waveform in the time slot from the first timing t1 to the second timing t2 in which the voltage signal value is maintained out of the range of the certain threshold TH. For example, the voltage signal value is constant from the first timing t1 to the second timing t2 as illustrated in FIG. 5A. Alternatively, for example, the voltage signal value gradually increases from the first timing t1 toward the second timing t2 as illustrated in FIG. 5B, the voltage signal value gradually decreases from the first timing t1 toward the second timing t2 as illustrated in FIG. 5C, or the voltage signal value gradually increases from the first timing t1 toward the middle-point timing t3 and gradually decreases from the middle-point timing t3 toward the second timing t2 as illustrated in FIG. 5D. In cases of waveforms such as in FIGS. 5B and 5D, the first timing t1 is a timing at which the voltage signal value becomes out of the range of the threshold TH for the first time in one cycle (becomes larger than the threshold TH), and thus the first timing t1 is a timing at which the voltage signal value rises. In a case of any waveform, the differential-value calculation unit 4122 may regard the voltage signal value at any timing between the first timing t1 and the second timing t2 as a peak value P. However, the differential-value calculation unit 4122 preferably regards the voltage signal value P3 at the middle-point timing t3 as a peak value P. For example, in cases of waveforms having edges at rising and falling as illustrated in FIGS. 5B and 5C, when the voltage signal value P1 at the first timing t1 of rising is regarded as a peak value P, the difference between the voltage signal value P1 as the peak value P and the voltage signal value P2 at the second timing t2 of falling is large, and the actual peak value P potentially cannot be highly accurately detected due to influence of the edges. Similarly, in cases of the waveforms illustrated in FIGS. 5B and 5C, when the voltage signal value P2 at the second timing t2 of falling is regarded as a peak value P, the difference between the voltage signal value P2 as the peak value P and the voltage signal value P1 at the first timing t1 of rising is large, and the actual peak value P potentially cannot be highly accurately detected due to influence of the edges. However, when the voltage signal value P3 at the middle-point timing t3 is regarded as a peak value P, the actual peak value P can be highly accurately detected without influence of the edges. In a case of the waveform illustrated in FIG. 5D, as well, the actual peak value P can be highly accurately detected when the voltage signal value P3 at the middle-point timing t3 is regarded as a peak value P.

The differential-value calculation unit 4122 may calculate the time differential value of the virtual line L connecting peak values P of a phase at respective times by any method using peak values P of the voltage signal at respective times. For example, the differential-value calculation unit 4122 may calculate, based on a peak value P at a calculation target timing and a peak value P at the previous timing of the calculation target timing, the time differential value of the virtual line L connecting the peak values P. In this case, for example, the differential-value calculation unit 4122 may calculate, as the time differential value at the calculation target timing, a value obtained by dividing the difference between the peak value P at the calculation target timing and the peak value P at the previous timing by the time between the timings. That is, in this case, the value obtained by dividing the difference between the peak value P at the calculation target timing and the peak value P at the previous timing by the time between the timings corresponds to the gradient of the virtual line L connecting the peak value P at the calculation target timing and the peak value P at the previous timing, and thus can be regarded as the time differential value of the virtual line L. In a duration (for example, duration T illustrated in FIG. 4) in which the voltage signal value is continuously in the range of the certain threshold TH, the reference value (in the present example, 0 V) in the range of the certain threshold TH may be regarded as a peak value P in the duration as illustrated in FIG. 4 when the time differential value of the virtual line L is calculated.

FIG. 6 is a diagram illustrating temporal change of the time differential value of each phase voltage signal. The differential-value calculation unit 4122 calculates, at each time point (at each timing), the time differential value of the virtual line L connecting peak values P of each phase voltage signal. When the time differential value of the virtual line L connecting peak values P of each phase voltage signal at each time point is plotted on a time axis, a temporal waveform as illustrated in, for example, FIG. 6 is obtained. As illustrated in FIG. 6, the time differential value of each phase voltage signal is maintained at a constant value for a certain time during which the peak value of the phase voltage signal increases at a certain gradient. In addition, the time differential value of each phase voltage signal is maintained at a constant value for a certain time during which the peak value of the phase voltage signal decreases at a certain gradient.

In the present embodiment, as described above, detection of peak values P and calculation of the time differential value are performed by using a voltage signal digitally converted by the analog-digital conversion unit 411. However, it is not essential to use the digitally converted voltage signal. For example, the analog value of each phase voltage signal of the alternating-current motor 10 may be detected and peak values P of the voltage signal may be detected from the detected analog value of the voltage signal. In this case, for example, the analog value of the voltage signal that varies is held at a constant value by sample-hold at a certain timing. The differential-value calculation unit 4122 detects the held analog value of the voltage signal as a peak value P. Then, the differential-value calculation unit 4122 calculates the time differential value of the virtual line L connecting peak values P by the same method as described above based on the peak value P of the voltage signal detected at each time by holding the analog value. Specifically, for example, the differential-value calculation unit 4122 may calculate, as the time differential value at a calculation target timing, a value obtained by dividing the difference between a peak value P at the calculation target timing and a peak value P at the previous timing by the time between the timings. In this case, the value obtained by dividing the difference between the peak value P at the calculation target timing and the peak value P at the previous timing by the time between the timings corresponds to the gradient of the virtual line L connecting the peak value P at the calculation target timing and the peak value P at the previous timing, and thus can be regarded as the time differential value of the virtual line L.

The unnecessary-signal removal unit 413 outputs correction signals ($N_{02U}$, $N_{02W}$, and $N_{02V}$) obtained by removing unnecessary signals from the time differential values of the virtual lines L connecting peak values P of the phase voltage signals at each time point. Each unnecessary signal means a signal corresponding to a duration shorter than a certain time, during which the time differential value of the virtual line L connecting peak values P of the corresponding phase voltage signal of the alternating-current motor 10 is maintained at a constant value. Accordingly, each correction signal is a signal obtained by removing unnecessary signal from a signal indicating the time differential value of the virtual line L connecting peak values P of the corresponding phase voltage signal at each time point. In other words, each correction signal is a signal having a temporal waveform obtained by removing (setting to zero), from the temporal waveform of the time differential value of the virtual line L, the temporal waveform of the time differential value (in other words, unnecessary signal) in a time slot corresponding to a duration shorter than a certain time, during which the time differential value is maintained at a constant value. As illustrated in FIG. 6, there may be a plurality of unnecessary signals that are signals (regions surrounded by a dashed line circle in FIG. 6) each corresponding to a duration shorter than a certain time, during which the time differential value of the virtual line L connecting peak values P of each phase voltage signal is maintained at a constant value. The unnecessary-signal removal unit 413 removes such unnecessary signals by filtering or by masking for a constant time from energization.

Figure 7:
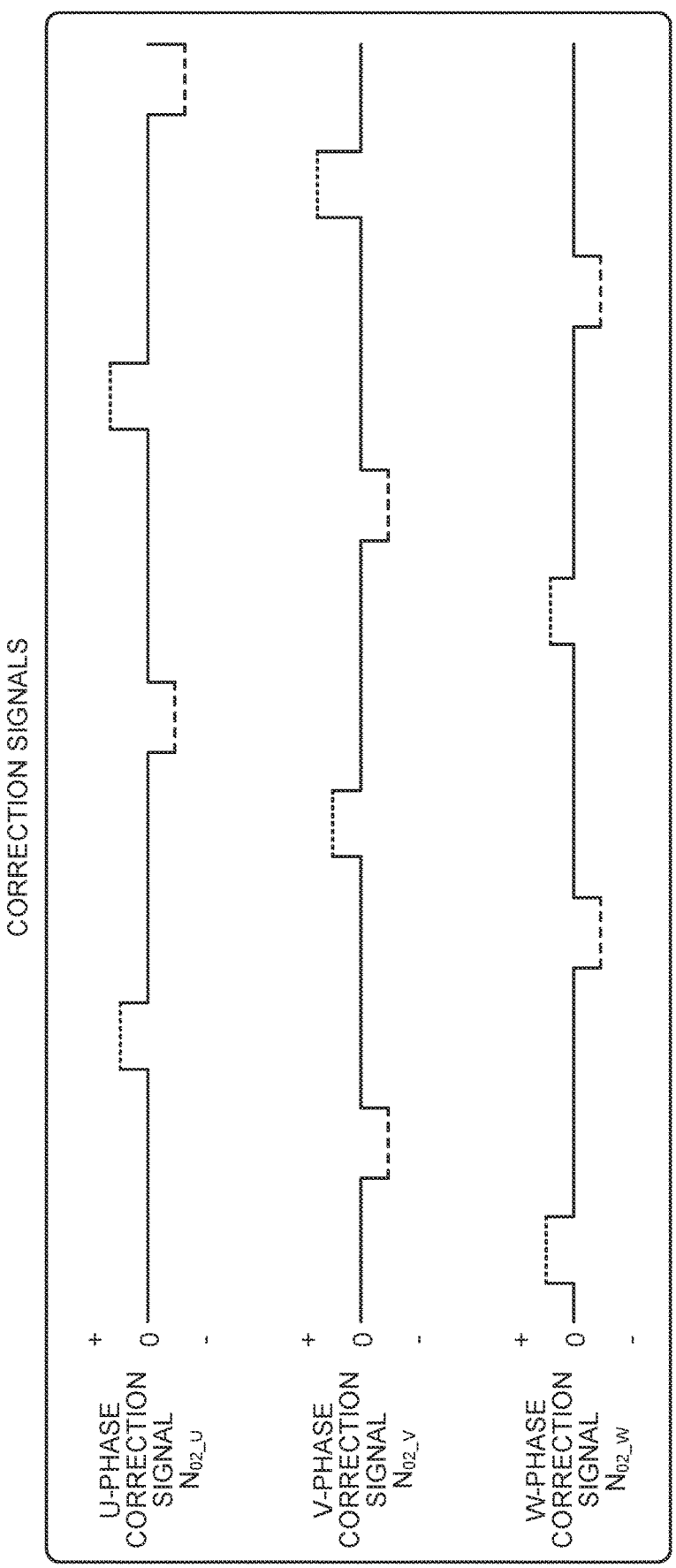
FIG. 7 is a diagram illustrating correction signals.

FIG. 7 is a diagram illustrating correction signals. As illustrated in FIG. 7, the time differential value of the virtual line L connecting peak values P of each phase voltage signal of the alternating-current motor 10 is maintained at a constant value for a certain time in a remaining signal after the unnecessary-signal removal from the time differential value of the virtual line L connecting peak values P of the phase voltage signal at each time point, and the unnecessary-signal removal unit 413 outputs the remaining signal as a correction signal.

The absolute-value calculation unit 414 calculates the absolute value of the correction signal of each phase. Specifically, the absolute-value calculation unit 414 executes processing that converts, into a positive signal, a negative signal remaining in the correction signal of each phase after the unnecessary-signal removal. In other words, the absolute-value calculation unit 414 outputs signals ($N_{03U}$, $N_{03W}$, and $N_{03V}$) of the absolute values of the correction signals of the phases.

Figure 8:
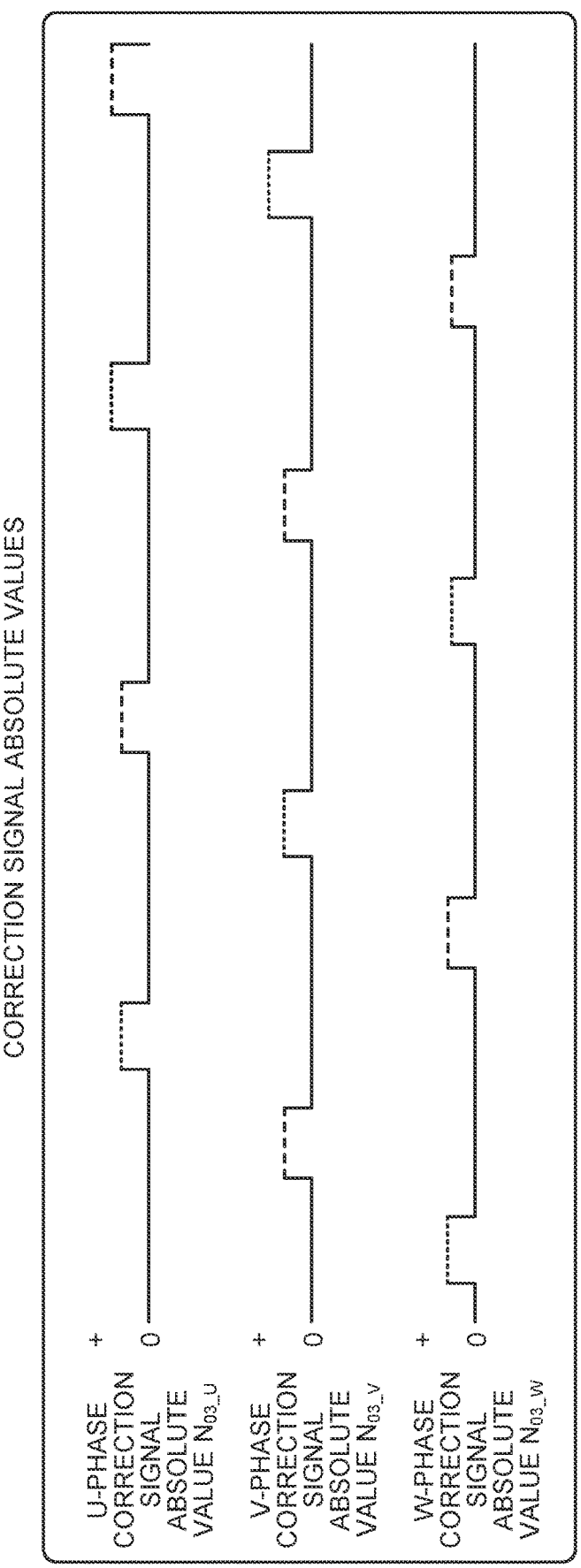
FIG. 8 is a diagram illustrating signals of phases obtained through absolute-value calculation of the correction signals.

FIG. 8 is a diagram illustrating signals of the phases obtained through the absolute-value calculation of the correction signals. As illustrated in FIG. 8, after the absolute-value calculation processing is executed, the correction signals of the phases include no negative signals but only positive signals or zero-value signals.

The merge unit 415 calculates a merged signal ($N_{04all}$) by merging signals included in the correction signals of the phases. In other words, the merge unit 415 outputs a merged signal ($N_{04all}$) obtained by merging signals included in the correction signals of the phases. In addition, the merge unit 415 calculates a merged signal by merging the absolute values of the correction signals of the phases. Specifically, the merge unit 415 executes processing that merges all of the U-phase, V-phase, and W-phase signals after the absolute-value calculation processing is executed. In other words, the merge unit 415 merges, for each time point, the correction signals of the phases after the absolute-value calculation processing is executed, thereby calculating a merged signal in which the absolute values of the correction signals of the phases are superimposed at each time point along the same time axis.

Figure 9:
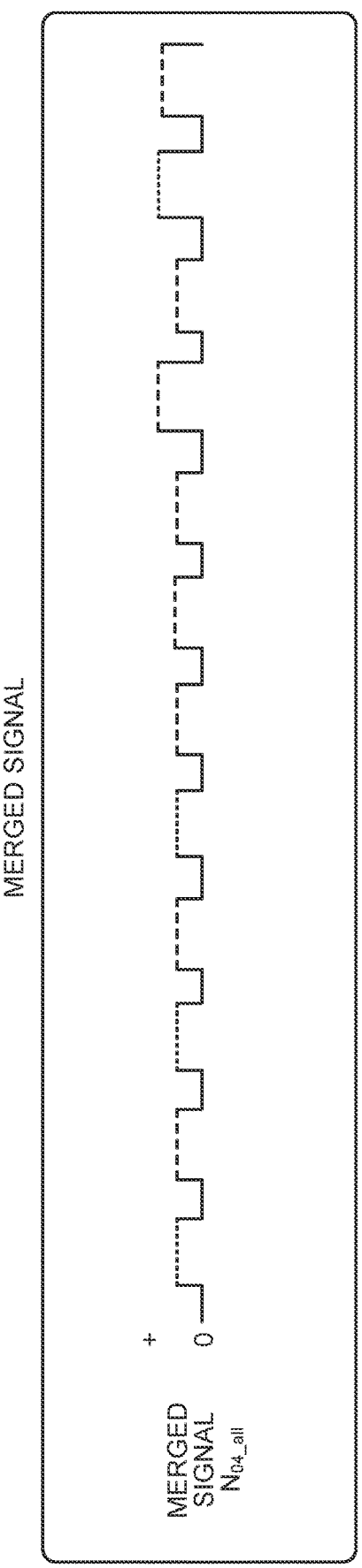
FIG. 9 is a diagram illustrating a merged signal obtained by merging all signals of the phases obtained through the absolute-value calculation.

FIG. 9 is a diagram illustrating the merged signal obtained by merging all signals of the phases obtained through the absolute-value calculation. As illustrated in FIG. 9, a signal obtained by merging all of the U-phase, V-phase, and W-phase signals is generated through execution of the processing that merges all signals of the phases obtained through the absolute-value calculation.

The sample-hold unit 416 calculates a sample-hold signal ($N_{05all}$) in which non-zero value of the merged signal is held. In other words, the sample-hold unit 416 outputs a sample-hold signal ($N_{05all}$) in which non-zero value of the merged signal is held. Specifically, the sample-hold unit 416 executes processing that holds non-zero value in the merged signal obtained by merging all absolute values of the phase signals at the merge unit 415 and maintains the non-zero value at a constant value until the absolute value of the phase signal changes to another non-zero value. In other words, the sample-hold signal is a signal obtained by correcting the merged signal so that the value of the merged signal in a time slot in which the value of the merged signal is zero becomes the previous value of the merged signal.

Figure 10:
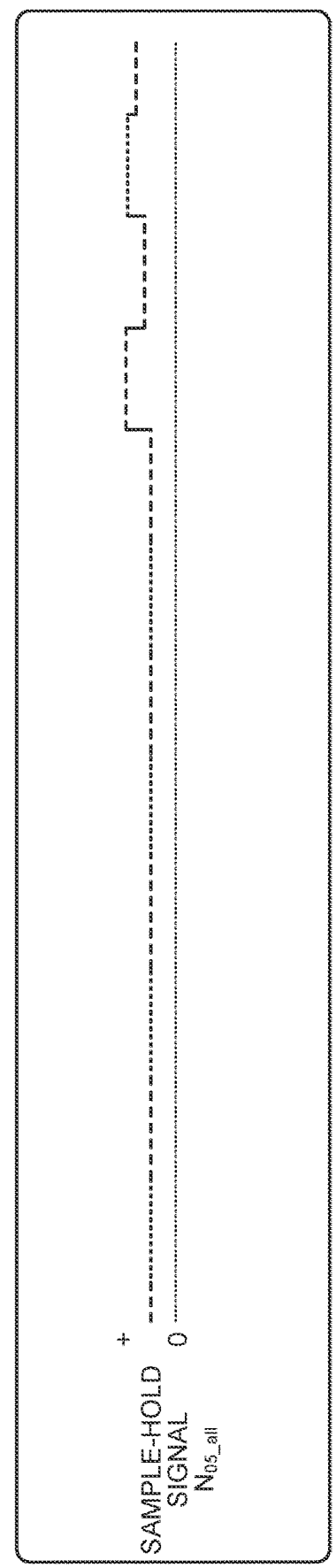
FIG. 10 is a diagram illustrating a sample-hold signal obtained by sampling and holding the merged signal.

FIG. 10 is a diagram illustrating the sample-hold signal obtained by sampling and holding the merged signal. As illustrated in FIG. 10, there is no duration in which the signal value is maintained at zero after the execution of the sample-hold processing.

The wavelength calculation unit 417 calculates the wavelength of each phase voltage signal input to the alternating-current motor 10 based on the time differential value of the virtual line L connecting peak values P of the phase voltage signal of the alternating-current motor 10. The wavelength calculation unit 417 includes a first wavelength calculation unit 4171, a second wavelength calculation unit 4172, and a third wavelength calculation unit 4173.

The first wavelength calculation unit 4171 calculates the wavelength of each phase voltage signal input to the alternating-current motor 10 from the time differential value. In other words, the first wavelength calculation unit 4171 calculates the wavelength of each phase voltage signal input to the alternating-current motor 10 from the sample-hold signal. Specifically, the first wavelength calculation unit 4171 obtains the wavelength of each phase voltage signal input to the alternating-current motor 10 by calculating the reciprocal of the value of the sample-hold signal and multiplying the reciprocal by a proportional coefficient. The proportional coefficient can be obtained based on a unique constant of the alternating-current motor 10. The first wavelength calculation unit 4171 may calculate a moving average of the calculated wavelength. In this case, for example, the first wavelength calculation unit 4171 may calculate a moving average (for example, simple moving average) of the currently calculated wavelength and any wavelength calculated so far and may use the calculated moving average as the currently calculated wavelength. Accordingly, it is possible to reduce variation of the wavelength output from the first wavelength calculation unit 4171 when the variation is large.

The second wavelength calculation unit 4172 calculates the wavelength of each phase voltage signal input to the alternating-current motor 10 based on the timing at which the phase voltage signal has the intermediate voltage value and that is detected by the intermediate-voltage-value detection unit 4121. The second wavelength calculation unit 4172 can obtain the period of one rotation of the alternating-current motor 10 by calculating the difference between the timing (time point) at which the intermediate voltage value is detected and the previous timing (time point) at which the intermediate voltage value is detected. The second wavelength calculation unit 4172 can obtain the wavelength of each phase voltage signal input to the alternating-current motor 10 by calculating the reciprocal of the period obtained from the time point of the intermediate voltage value. The second wavelength calculation unit 4172 may calculate a moving average of the calculated wavelength. In this case, for example, the second wavelength calculation unit 4172 may calculate a moving average (for example, simple moving average) of the currently calculated wavelength and any wavelength calculated so far and may use the calculated moving average as the currently calculated wavelength. Accordingly, it is possible to reduce variation of the wavelength output from the second wavelength calculation unit 4172 when the variation is large.

The third wavelength calculation unit 4173 calculates the wavelength of each phase voltage signal input to the alternating-current motor 10 based on the wavelength calculated by the first wavelength calculation unit 4171 and the wavelength calculated by the second wavelength calculation unit 4172. In the example of the present embodiment, the third wavelength calculation unit 4173 calculates a moving average of the wavelength calculated by the first wavelength calculation unit 4171 and the wavelength calculated by the second wavelength calculation unit 4172 and outputs the moving average as the wavelength of each phase voltage signal input to the alternating-current motor 10. For example, the third wavelength calculation unit 4173 may calculate a simple non-weighted average value of the latest n wavelengths calculated by the first wavelength calculation unit 4171 and the latest n wavelengths calculated by the second wavelength calculation unit 4172.

The third wavelength calculation unit 4173 may calculate a weighted moving average of the wavelength of each phase voltage signal input to the alternating-current motor 10, which is calculated by the first wavelength calculation unit 4171 and the wavelength of each phase voltage signal input to the alternating-current motor 10, which is calculated by the second wavelength calculation unit 4172, and may output the weighted moving average as the wavelength of each phase voltage signal input to the alternating-current motor 10. The weighted moving average is the average of weighted individual data. Specifically, in the present embodiment, the third wavelength calculation unit 4173 may regard, as the wavelength of each phase voltage signal, a weighted moving average that is the average of a value obtained by multiplying the wavelength of the phase voltage signal calculated by the first wavelength calculation unit 4171 by a certain first weighting coefficient and a value obtained by multiplying the wavelength of the phase voltage signal calculated by the second wavelength calculation unit 4172 by a certain second weighting coefficient. Alternatively, for example, the third wavelength calculation unit 4173 may regard, as the wavelength of each phase voltage signal, a weighted moving average that is the average of values obtained by multiplying the latest n wavelengths calculated by the first wavelength calculation unit 4171 by the first weighting coefficient and values obtained by multiplying the latest n wavelengths calculated by the second wavelength calculation unit 4172 by the second weighting coefficient. The first weighting coefficient indicates the degree of influence of the wavelength of the phase voltage signal calculated by the first wavelength calculation unit 4171 on the weighted moving average, and the second weighting coefficient indicates the degree of influence of the wavelength of the phase voltage signal calculated by the second wavelength calculation unit 4172 on the weighted moving average. In this manner, a wavelength on which the actual wavelength of each phase voltage signal is highly accurately reflected can be calculated by regarding, as the wavelength of the phase voltage signal, the weighted moving average calculated by using the first weighting coefficient and the second weighting coefficient, and accordingly, it is possible to more excellently prevent step-out.

The first weighting coefficient and the second weighting coefficient may be set as desired, but the third wavelength calculation unit 4173 may change at least one of the first weighting coefficient and the second weighting coefficient in accordance with a load on the alternating-current motor 10 when calculating the weighted moving average of wavelengths. For example, when variation of the wavelength calculated by the first wavelength calculation unit 4171 is large and fluctuation of the rotation speed of the alternating-current motor 10 is thought to be large, the third wavelength calculation unit 4173 may increase the first weighting coefficient when calculating the weighted moving average of wavelengths of each phase voltage signal. More specifically, for example, when variation of the load on the alternating-current motor 10 is equal to or larger than a certain threshold, the third wavelength calculation unit 4173 may change at least one of the first weighting coefficient and the second weighting coefficient so that the ratio of the first weighting coefficient relative to the second weighting coefficient becomes larger than when the load variation is smaller than the threshold. Alternatively, for example, the third wavelength calculation unit 4173 may change at least one of the first weighting coefficient and the second weighting coefficient so that the ratio of the first weighting coefficient relative to the second weighting coefficient increases as the variation of the load on the alternating-current motor 10 increases. The variation of the load on the alternating-current motor 10 may be detected as desired, but for example, the difference between a voltage signal wavelength previously calculated by the first wavelength calculation unit 4171 and a voltage signal wavelength currently calculated by the first wavelength calculation unit 4171 may be calculated as the load variation.

The switching-signal generation unit 418 generates a signal that switches the phases of the alternating-current motor 10 to which alternating-current voltage is applied based on the calculated wavelength. Specifically, the switching-signal generation unit 418 predicts the position of the rotor of the alternating-current motor 10 based on the wavelength calculated by the wavelength calculation unit 417 and generates the signal that switches the phases of the alternating-current motor 10 to which alternating-current voltage is applied so that voltage direction switching is performed six times (switching at each 60°) while the alternating-current motor 10 completes one electrical-angle rotation (360° rotation). In other words, the switching-signal generation unit 418 outputs, to the drive circuit 50, a logic signal, in other words, a pulse width modulation (PWM) signal indicating a command for a phase at which alternating-current voltage is applied.

The drive circuit 50 outputs drive signals to the gates of the six semiconductor switching elements (U+, V+, W+, U−, V−, and W−) included in the inverter circuit in accordance with the PWM signal output from the switching-signal generation unit 418. The drive circuit 50 may be achieved by a semiconductor switching element such as a field-effect transistor (FET) or an IGBT. Accordingly, to drive the semiconductor switching elements, the drive circuit 50 may output, as the drive signals, signals obtained by amplifying the PWM signal as necessary.

Control Method and Computer Program

Figure 11:
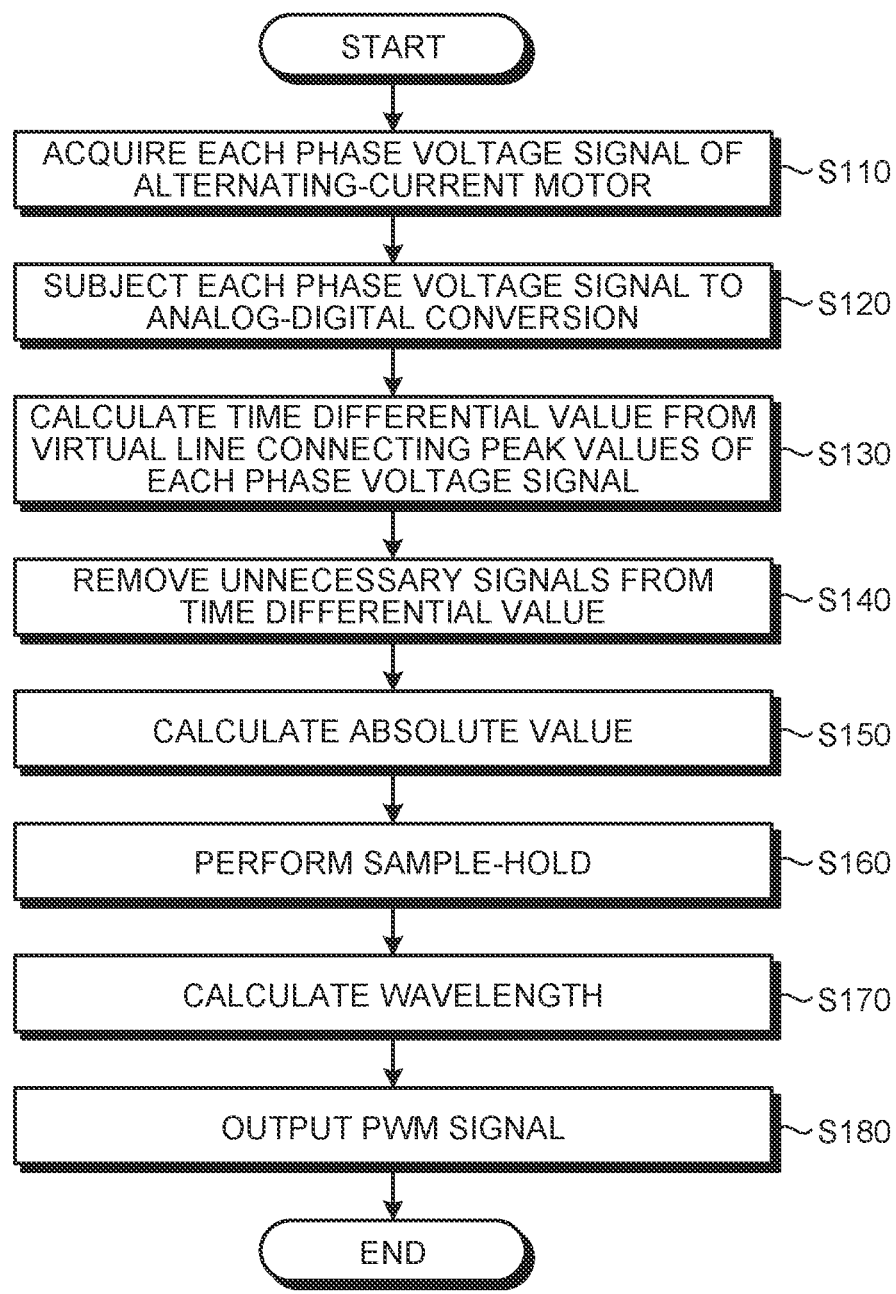
FIG. 11 is a flowchart illustrating a control method according to the present disclosure.

The following describes a control method according to the present disclosure with reference to FIG. 11. FIG. 11 is a flowchart illustrating the control method according to the present disclosure. Each step of the method of controlling the alternating-current motor 10 will be described with reference to FIG. 11. First, in the control method according to the present disclosure, each phase voltage signal of the alternating-current motor 10 is acquired (step S110). Subsequently, each acquired phase voltage signal is subjected to analog-digital conversion (step S120). Then, the time differential value of the virtual line L connecting peak values P of each phase voltage signal subjected to the analog-digital conversion is calculated (step S130). Then, unnecessary signal is removed from the time differential value of the virtual line L connecting peak values P of each phase voltage signal (step S140). Then, processing that calculates an absolute value is executed on the time differential value of each phase voltage signal from which unnecessary signal is removed (step S150). Then, sample-hold processing that holds the absolute value is executed (step S160). Then, processing that calculates a wavelength by using the sample-hold value is executed (step S170). Then, the PWM signal that drives the alternating-current motor 10 based on the wavelength is output (step S180).

The above-described control method may be executed by using the control device 40 or may be executed by any other optional means. The above-described control method may be executed as a computer program that is executed by a computer included in the control device 40.

With the control method and the computer program thus configured, it is possible to calculate the wavelength of each phase voltage signal input to the alternating-current motor 10 from the time differential value of each phase voltage signal, and thus it is possible to reduce influence due to variation of the load on the alternating-current motor 10 when controlling the alternating-current motor 10.

Second Embodiment

The following describes the control device 40 according to the second embodiment. The control device 40 according to the second embodiment has the same configuration as the control device 40 according to the first embodiment except that no absolute-value calculation unit 414 is provided and the unnecessary-signal removal unit 413 performs different processing. Thus, the following describes the part of the configuration of the control device 40 according to the second embodiment that is different from the configuration of the control device 40 according to the first embodiment.

The unnecessary-signal removal unit 413 outputs, as a correction signal (second correction signal), a signal obtained by removing negative value signal in addition to unnecessary signal that has a constant value for a duration shorter than a certain time from the time differential value of the virtual line L connecting peak values P of each phase voltage signal of the alternating-current motor 10. In other words, the unnecessary-signal removal unit 413 outputs, as the second correction signal, a signal having a temporal waveform obtained by removing (setting to zero), from the temporal waveform of the time differential value of the virtual line L, the temporal waveform of the time differential value in a time slot in which the time differential value is maintained at a constant value for a duration shorter than a certain time and a time slot in which the time differential value is negative.

Figure 12:
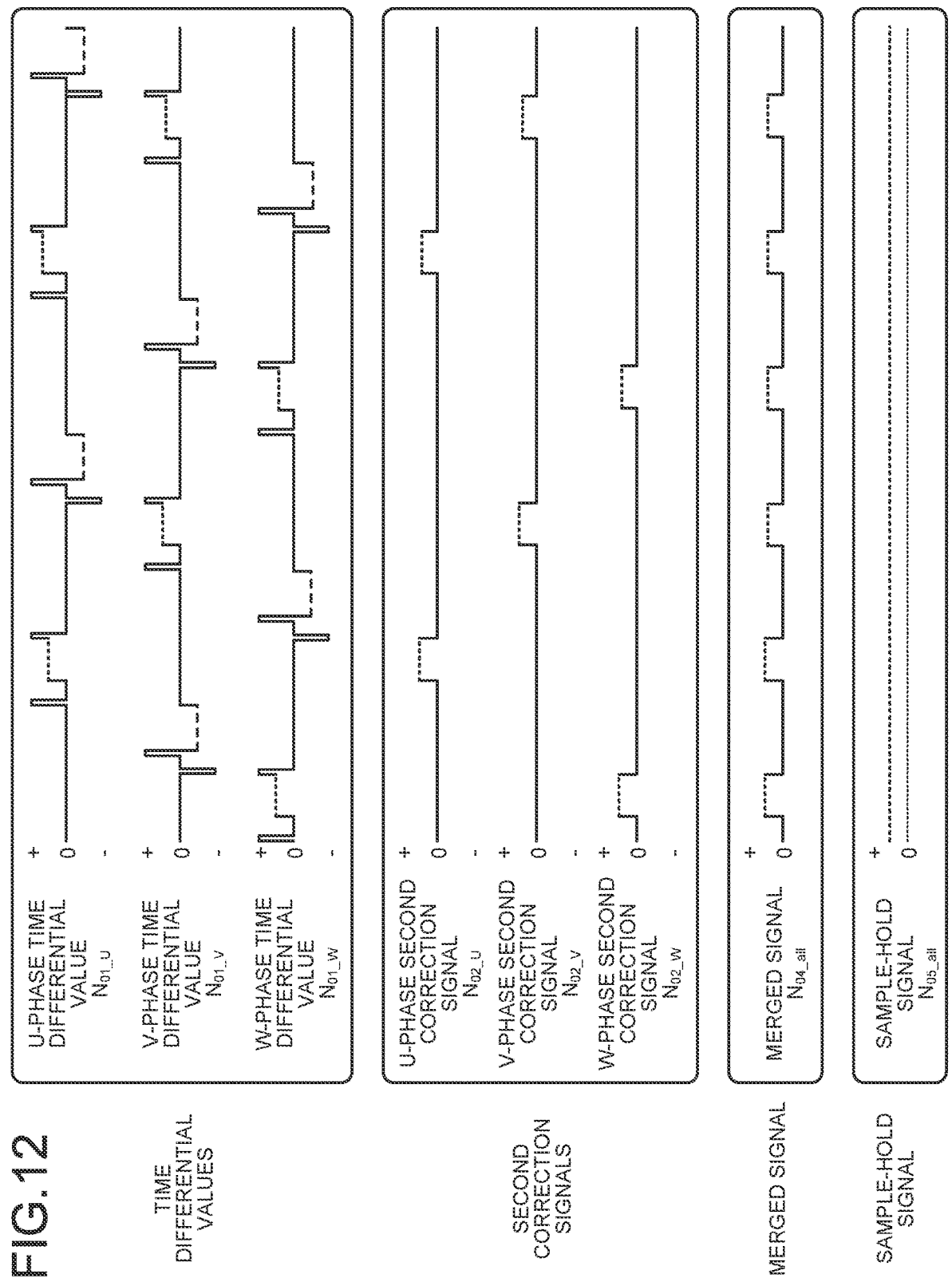
FIG. 12 is a diagram illustrating results of signal processing at a control device according to a second embodiment.

FIG. 12 is a diagram illustrating results of signal processing at the control device according to the second embodiment. As illustrated in FIG. 12, in the signal processing at the control device 40 according to the second embodiment, the unnecessary-signal removal unit 413 removes negative value signal in addition to signal that has a constant value for a duration shorter than a certain time from the time differential value of each phase voltage signal, and accordingly, the second correction signal indicating a signal subjected to the unnecessary-signal removal processing is a signal in which only positive values remain.

With this configuration, since the control device 40 includes no absolute-value calculation unit 414, a calculation load on the control unit 41 is reduced so that calculation resources of the control unit 41 can be allocated to other calculation.

Third Embodiment

The following describes the control device 40 according to the third embodiment. The control device 40 according to the third embodiment has the same configuration as the control device 40 according to the first embodiment except that no absolute-value calculation unit 414 is provided and the unnecessary-signal removal unit 413 and the merge unit 415 perform different processing. Thus, the following describes the part of the configuration of the control device 40 according to the third embodiment that is different from the configuration of the control device 40 according to the first embodiment.

The unnecessary-signal removal unit 413 outputs, as a correction signal (third correction signal), a signal obtained by removing any positive value signal in addition to signal that has a constant value for a duration shorter than a certain time from the time differential value of each phase voltage signal of the alternating-current motor 10. In other words, the unnecessary-signal removal unit 413 outputs, as the third correction signal, a signal having a temporal waveform obtained by removing (setting to zero), from the temporal waveform of the time differential value of the virtual line L, the temporal waveform of the time differential value in a time slot in which the time differential value is maintained at a constant value for a duration shorter than a certain time and a time slot in which the time differential value is positive.

The merge unit 415 inverts the sign of each third correction signal and calculates a merged signal by merging the third correction signals of the phases. As described above, the unnecessary-signal removal unit 413 of the control device 40 according to the third embodiment regards and removes any positive value of each phase voltage signal of the alternating-current motor 10 as an unnecessary signal. Thus, only negative value signals remain in each third correction signal output from the unnecessary-signal removal unit 413. The merge unit 415 converts the negative values of each third correction signal into positive values and calculates a merged signal by merging the third correction signals of the phases.

Figure 13:
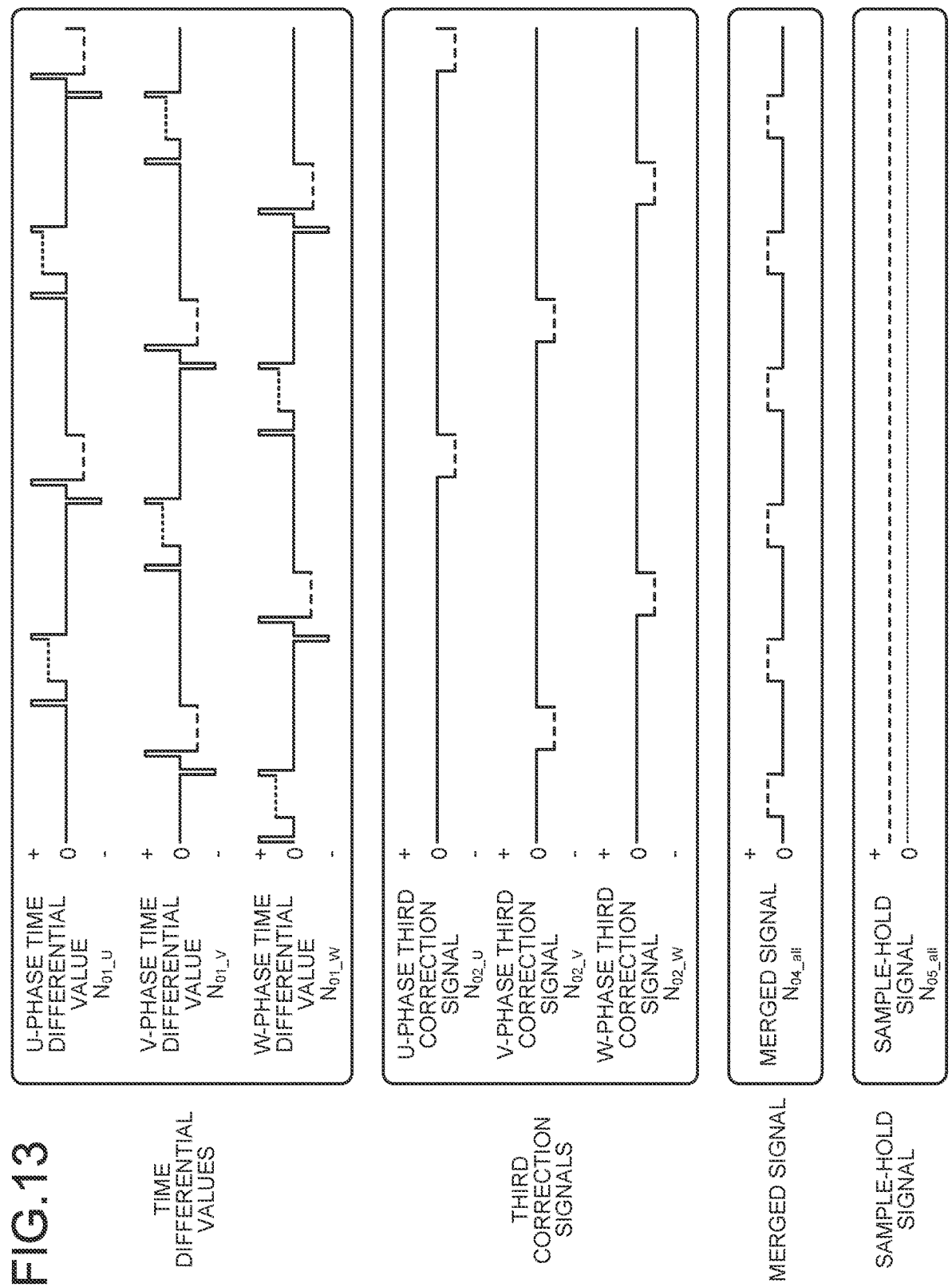
FIG. 13 is a diagram illustrating results of signal processing at a control device according to a third embodiment.

FIG. 13 is a diagram illustrating results of signal processing at the control device according to the third embodiment. As illustrated in FIG. 13, in the signal processing at the control device 40 according to the third embodiment, the unnecessary-signal removal unit 413 removes any positive value signal in addition to signal that has a constant value for a duration shorter than a certain time from the time differential value of each phase voltage signal, and accordingly, the third correction signal indicating a signal subjected to the unnecessary-signal removal processing is a signal in which only negative values remain. Then, the merge unit 415 converts the negative values of the third correction signal into positive values and calculates a merged signal by merging the third correction signals of the phases, and accordingly, the merged signal at the control device 40 according to the third embodiment is a positive value signal.

With this configuration, since the control device 40 includes no absolute-value calculation unit 414, a calculation load on the control unit 41 is reduced so that calculation resources of the control unit 41 can be allocated to other calculation.

Fourth Embodiment

The following describes the control device 40 according to the fourth embodiment. The control device 40 according to the fourth embodiment has the same configuration as the control device 40 according to the first embodiment except that the analog-digital conversion unit 411 performs different processing. Thus, the following describes the part of the configuration of the control device 40 according to the fourth embodiment that is different from the configuration of the control device 40 according to the first embodiment.

In the first embodiment, each phase voltage signal of the alternating-current motor 10 is acquired with respect to the ground (0 V), but in the fourth embodiment, the analog-digital conversion unit 411 acquires each phase voltage signal of the alternating-current motor 10 with respect to the positive power voltage Vcc. Specifically, the analog-digital conversion unit 411 acquires, as each phase voltage signal of the alternating-current motor 10, the difference between the phase voltage signal of the alternating-current motor 10 and the voltage value of output voltage from the positive power source 30.

Figure 14:
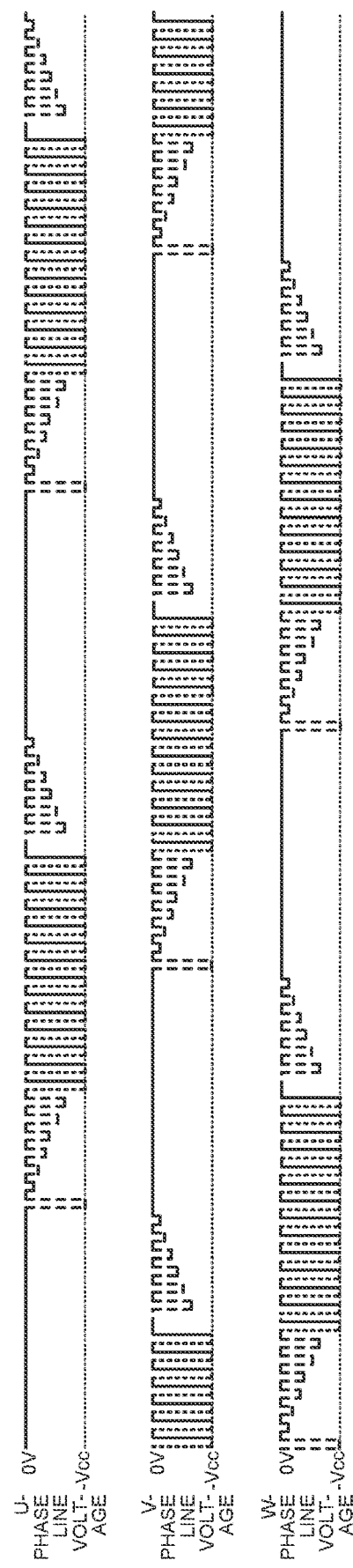
FIG. 14 is a diagram illustrating phase voltage signals acquired by an analog-digital conversion unit of a control device according to a fourth embodiment.

FIG. 14 is a diagram illustrating the phase voltage signals acquired by the analog-digital conversion unit of the control device according to the fourth embodiment. As illustrated in FIG. 14, each phase voltage signal acquired by the analog-digital conversion unit 411 of the control device 40 according to the fourth embodiment is the difference from the voltage value of output voltage of the positive power source 30, and thus is a signal having a value that varies with an upper limit at the voltage value of output voltage of the positive power source 30.

Similarly to the control device 40 according to the first embodiment, the control device 40 with this configuration can provide desired torque to the load on the alternating-current motor 10, for example, when there occurs abrupt load variation that is shorter than the wavelength of the alternating-current motor 10.

Figure 15:
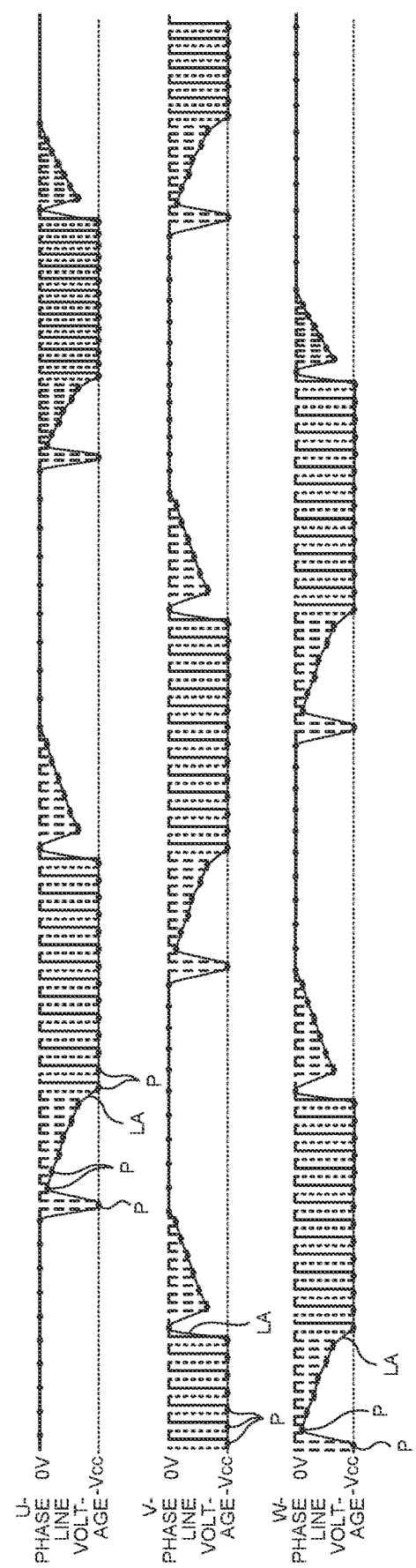
FIG. 15 is a diagram illustrating exemplary virtual lines each connecting peak values of the corresponding phase voltage signal in the fourth embodiment.

FIG. 15 is a diagram illustrating exemplary virtual lines each connecting peak values of the corresponding phase voltage signal in the fourth embodiment. In the first embodiment, each phase voltage signal changes while the voltage value is maintained between 0 V and the positive power voltage Vcc inclusive (for example, changes in the range of 0 V to 12 V) as illustrated in, for example, FIG. 4. However, in the fourth embodiment, each phase voltage signal changes while the voltage value is maintained between −Vcc to 0 V inclusive (for example, changes in the range of −12 V to 0 V) as illustrated in, for example, FIG. 15. In this case, the differential-value calculation unit 4122 may calculate the absolute values of peak values P of each phase voltage signal and calculate the time differential value of the virtual line L connecting peak values P at respective times based on the absolute values of peak values P of the phase voltage signal at respective times. Specifically, a virtual line LA in FIG. 15 is a line connecting peak values P, but the virtual line L connecting the absolute values of the peak values P has the inverted sign and accordingly has the same shape as in the first embodiment, and thus the time differential value thereof can be calculated as in the first embodiment. The part of the calculation method of the time differential value other than the absolute value calculation is the same as in the first embodiment, and thus detailed description thereof is omitted. However, in this case, for example, when the voltage signal value is smaller than the certain threshold TH (for example, smaller than 0 V), the differential-value calculation unit 4122 may determine that the voltage signal value is out of the range of the certain threshold TH and may detect a peak value P.

Configurations and Effects

The control device 40 according to the present disclosure controls voltage signals of a plurality of phases, the voltage signals being applied to the alternating-current motor 10, and includes: the differential-value calculation unit 4122 configured to calculate the time differential value of the virtual line L connecting peak values P of each of phase voltage signals that are voltage signals of the respective phases, the voltage signals being input to the alternating-current motor 10; the wavelength calculation unit 417 configured to calculate the wavelength of each phase voltage signal input to the alternating-current motor 10 from the time differential value; and the switching-signal generation unit 418 configured to generate, based on the calculated wavelength, a signal that switches the phase of the alternating-current motor 10.

With this configuration, it is possible to control the alternating-current motor 10 based on the calculated wavelength, for example, even when there occurs abrupt load variation that is shorter than the wavelength of the alternating-current motor 10, and thus it is possible to prevent step-out and provide desired torque to the load on the alternating-current motor 10.

In the present disclosure, each phase voltage signal is a PWM signal, and the differential-value calculation unit 4122 acquires, as a peak value P of each phase voltage signal, the value of the phase voltage signal at any timing between the first timing t1 at which the value of the phase voltage signal rises and the second timing t2 at which the value of the phase voltage signal falls after the first timing t1. When peak values P are acquired in this manner, it is possible to highly accurately calculate the time differential value of the virtual line L connecting the peak values P. Moreover, readout of a peak value P differs in some cases depending on a microcomputer, but according to the present disclosure, a peak value can be obtained as the voltage signal value between the first timing t1 at which the voltage signal value rises and the second timing t2 at which the voltage signal value falls, and thus adjustment of a readout timing is not complicated and processing is prevented from being complicated.

The differential-value calculation unit 4122 according to the present disclosure acquires, as a peak value P of each phase voltage signal, the value of the phase voltage signal at the middle-point timing t3 that is the middle point between the first timing t1 and the second timing t2. When peak values P are acquired in this manner, edges of the PWM signal of each phase voltage signal are unlikely to provide influence and it is possible to highly accurately calculate the time differential value of the virtual line L connecting the peak values P.

The control device 40 according to the present disclosure further includes: the unnecessary-signal removal unit 413 configured to output a correction signal obtained by removing, from the time differential value of each phase, unnecessary signal corresponding to a duration shorter than a certain time, during which the time differential value is maintained at a constant value; the merge unit 415 configured to calculate a merged signal obtained by merging the correction signals of the respective phases; the sample-hold unit 416 configured to calculate a sample-hold signal obtained through correction that the value of the merged signal is maintained at a constant value until the value changes to another value other than zero; and the first wavelength calculation unit 4171 configured to calculate the wavelength of each phase voltage signal by multiplying the reciprocal of the value of the sample-hold signal by a proportional coefficient.

With this configuration, it is possible to provide desired torque to the load on the alternating-current motor 10, for example, even when there occurs abrupt load variation that is shorter than the wavelength of the alternating-current motor 10.

The control device 40 according to the present disclosure further includes: the intermediate-voltage-value detection unit 4121 configured to detect, from each phase voltage signal of the alternating-current motor 10, a timing at which the phase voltage signal has an intermediate voltage value; the second wavelength calculation unit 4172 configured to calculate the wavelength of each phase voltage signal applied to the alternating-current motor 10 based on the detected timing of the intermediate voltage value; and the third wavelength calculation unit 4173 configured to calculate a moving average of the wavelengths calculated by the first wavelength calculation unit 4171 and the second wavelength calculation unit 4172, respectively, for each phase voltage signal applied to the alternating-current motor 10, and the switching-signal generation unit 418 generates a switching signal based on the moving average calculated by the third wavelength calculation unit 4173.

With this configuration, the wavelength of the alternating-current motor 10 is calculated based on the moving average of the wavelengths calculated by the first wavelength calculation unit 4171 and the second wavelength calculation unit 4172, respectively, and thus the accuracy of the wavelength calculation can be increased.

The third wavelength calculation unit 4173 of the control device 40 according to the present disclosure calculates a weighted moving average of the product of the wavelength calculated by the first wavelength calculation unit 4171 for each phase voltage signal and the first weighting coefficient representing the degree of influence, on the weighted average, of the wavelength calculated by the first wavelength calculation unit 4171 for each phase voltage signal and the product of the wavelength calculated by the second wavelength calculation unit 4172 for the phase voltage signal and the second weighting coefficient representing the degree of influence, on the weighted average, of the wavelength calculated by the second wavelength calculation unit 4172 for the phase voltage signal. The switching-signal generation unit 418 generates the switching signal based on the weighted moving average calculated by the third wavelength calculation unit 4173.

With this configuration, since the weighting coefficients of the wavelengths calculated by the first wavelength calculation unit 4171 and the second wavelength calculation unit 4172 can be set to calculate the weighted moving average, it is possible to maintain both the capability of following the variation of the load on the alternating-current motor 10 and the accuracy of calculating the wavelength of each phase voltage signal applied to the alternating-current motor 10.

The third wavelength calculation unit 4173 of the control device 40 according to the present disclosure changes at least one of the first weighting coefficient and the second weighting coefficient in accordance with the load on the alternating-current motor 10 and calculates the weighted moving average of wavelengths.

With this configuration, when the variation of the load on the alternating-current motor 10 is large, it is possible to set the first weighting coefficient and the second weighting coefficient in accordance with the load variation by, for example, increasing the first weighting coefficient of the wavelength calculated by the first wavelength calculation unit 4171 based on the time differential value, and thus it is possible to calculate the weighted moving average of wavelengths in accordance with the load variation and highly accurately reflect the actual wavelength of each phase voltage signal, thereby more excellently preventing step-out.

A computer program according to the present disclosure controls voltage signals of a plurality of phases, the voltage signals being applied to the alternating-current motor 10, and causes a computer to execute: calculating the time differential value of the virtual line L connecting peak values P of each of phase voltage signals that are voltage signals of the respective phases, the voltage signals being input to the alternating-current motor 10; calculating the wavelength of each phase voltage signal input to the alternating-current motor 10 from the time differential value; and generating, based on the calculated wavelength, a signal that switches the phase of the alternating-current motor 10.

With this configuration, it is possible to control the alternating-current motor 10 based on the calculated wavelength, for example, even when there occurs abrupt load variation that is shorter than the wavelength of the alternating-current motor 10, and thus it is possible to prevent step-out and provide desired torque to the load on the motor.

According to the present disclosure, it is possible to prevent step-out when abrupt load variation occurs, and thus it is possible to provide a motor control device and a computer program that are capable of providing desired torque for a load on a motor.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A motor control device configured to control voltage signals of a plurality of phases, the voltage signals being applied to an alternating-current motor, the motor control device comprising:
a differential-value calculation unit configured to calculate a time differential value of a virtual line connecting peak values of each of phase voltage signals that are voltage signals of the respective phases, the voltage signals being input to the alternating-current motor;
a wavelength calculation unit configured to calculate a wavelength of each phase voltage signal input to the alternating-current motor from the time differential value; and
a switching-signal generation unit configured to generate, based on the calculated wavelength, a switching signal that switches the phase of the alternating-current motor, wherein
the wavelength calculation unit, and the switching-signal generation unit are circuits or controllers that execute a program stored in a storage unit.

2. The motor control device according to claim 1, wherein each phase voltage signal is a PWM signal, and
the differential-value calculation unit acquires, as a peak value of each phase voltage signal, the value of the phase voltage signal at any timing between a first timing at which the value of the phase voltage signal rises and a second timing at which the value of the phase voltage signal falls after the first timing.

3. The motor control device according to claim 2, wherein the differential-value calculation unit acquires, as a peak value of each phase voltage signal, the value of the phase voltage signal at a middle-point timing that is the middle point between the first timing and the second timing.

4. The motor control device according to claim 1, wherein the circuits or the controllers further comprises:
an unnecessary-signal removal unit configured to generate a correction signal obtained by removing, from the time differential value of each phase, an unnecessary signal corresponding to a duration shorter than a certain time, during which the time differential value of which is maintained at a constant value;
a merge unit configured to calculate a merged signal obtained by merging the correction signals of the respective phases;
a sample-hold unit configured to calculate a sample-hold signal obtained through correction that the value of the merged signal is maintained at a constant value until the value changes to another value other than zero; and
a first wavelength calculation unit configured to calculate the wavelength of each phase voltage signal by multiplying the reciprocal of the value of the sample-hold signal by a proportional coefficient.

5. The motor control device according to claim 4, wherein the circuits or the controllers further comprises:
an intermediate-voltage-value detection unit configured to detect, from each phase voltage signal of the alternating-current motor, a timing at which the phase voltage signal has an intermediate voltage value;
a second wavelength calculation unit configured to calculate the wavelength of each phase voltage signal input to the alternating-current motor based on the detected timing of the intermediate voltage value; and
a third wavelength calculation unit configured to calculate a moving average of the wavelengths calculated by the first wavelength calculation unit and the second wavelength calculation unit, respectively, for each phase voltage signal input to the alternating-current motor, wherein
the switching-signal generation unit generates the switching signal based on the moving average calculated by the third wavelength calculation unit.

6. The motor control device according to claim 5, wherein the third wavelength calculation unit calculates a weighted moving average of
the product of the wavelength calculated by the first wavelength calculation unit for each phase voltage signal and a first weighting coefficient representing the degree of influence, on a weighted average, of the wavelength calculated by the first wavelength h calculation unit for each phase voltage signal, and
the product of the wavelength calculated by the second wavelength calculation unit for the phase voltage signal and a second weighting coefficient representing the degree of influence, on a weighted average, of the wavelength calculated by the second wavelength calculation unit for the phase voltage signal, and
the switching-signal generation unit generates the switching signal based on the weighted moving average calculated by the third wavelength calculation unit.

7. The motor control device according to claim 6, wherein the third wavelength calculation unit changes at least one of the first weighting coefficient and the second weighting coefficient in accordance with a load on the alternating-current motor and calculates the weighted moving average of the wavelengths.

* * * * *